United States Patent [19]
Baker et al.

[11] 3,821,855
[45] July 2, 1974

[54] DETECTING APPARATUS

[75] Inventors: Earl A. Baker, Big Flats; Joseph R. Jones, Corning, both of N.Y.

[73] Assignee: Corning Glass Works, Corning, N.Y.

[22] Filed: June 6, 1972

[21] Appl. No.: 260,120

[52] U.S. Cl............................ 33/174 L, 209/88 R
[51] Int. Cl......................... G01b 7/00, G01b 7/34
[58] Field of Search.......... 33/174 R, 174 A, 174 L, 33/174 Q, 174 M, 172 E; 209/88 R

[56] References Cited
UNITED STATES PATENTS

| | | | |
|---|---|---|---|
| 2,018,399 | 10/1935 | Engst et al. | 33/174 L |
| 2,197,198 | 4/1940 | Street | 33/178 R |
| 2,427,152 | 9/1947 | Moore | 33/174 Q |
| 2,690,620 | 10/1954 | Arelt | 33/174 L |
| 3,021,603 | 2/1962 | Beeson | 33/174 L |
| 3,106,780 | 10/1963 | Uhlig | 33/174 L |
| 3,557,462 | 1/1971 | Kiewicz et al. | 33/174 L |
| 3,696,513 | 10/1972 | Sullivan | 33/174 L |

FOREIGN PATENTS OR APPLICATIONS

| | | | |
|---|---|---|---|
| 160,478 | 3/1933 | Switzerland | 33/147 |
| 123,530 | 2/1947 | Australia | 33/172 E |

*Primary Examiner*—Louis R. Prince
*Assistant Examiner*—Richard R. Stearns
*Attorney, Agent, or Firm*—Charles W. Gregg; Clarence R. Patty, Jr.

[57] ABSTRACT

Apparatus for sensing or detecting, in an open-sided cavity of a container or nest for supporting an article having a peripheral wall of a uniform height, the presence or non-presence of such an article in said cavity and, if the presence of such an article is sensed or detected, whether the article is correctly or uniformly seated or positioned in the cavity. A reference or fixed probe and a plurality of actuable probes extend towards said cavity from a detector or detector assembly positioned adjacent said cavity and each is intended to contact a different one of a plurality of substantially equally spaced-apart points on the annular surface or rim of the peripheral wall of any article in the cavity when the probes move towards the cavity. If the actuable probes contact the rim of the peripheral wall of an article in the cavity at substantially the reference plane at which the fixed probe contacts such rim, display and/or control device or devices reflecting the presence and correct or uniform seating of the article in the cavity are actuated. If any of the actuable probes are not actuated to about the reference plane or are actuated slightly past that plane during the movement thereof towards said cavity, indications or displays and/or control devices reflecting incorrect or non-uniform seating of an article in the cavity, or non-presence of an article in the cavity, are actuated.

6 Claims, 6 Drawing Figures

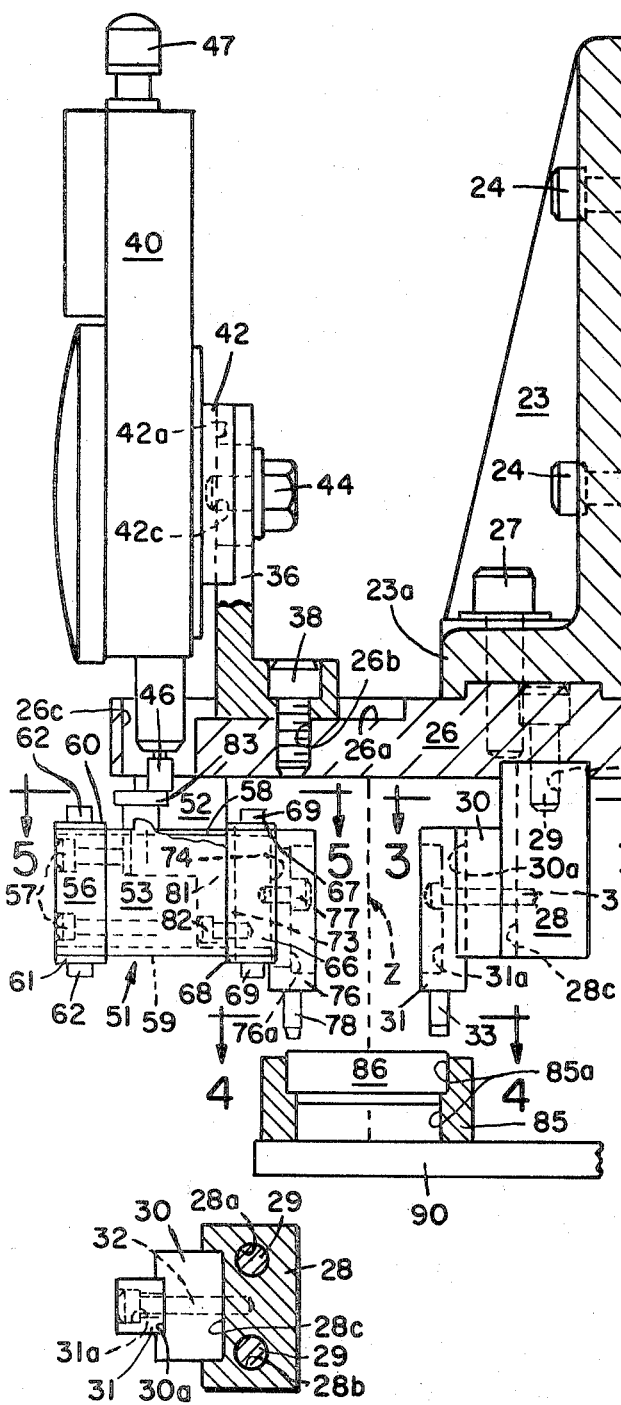
Fig. 2
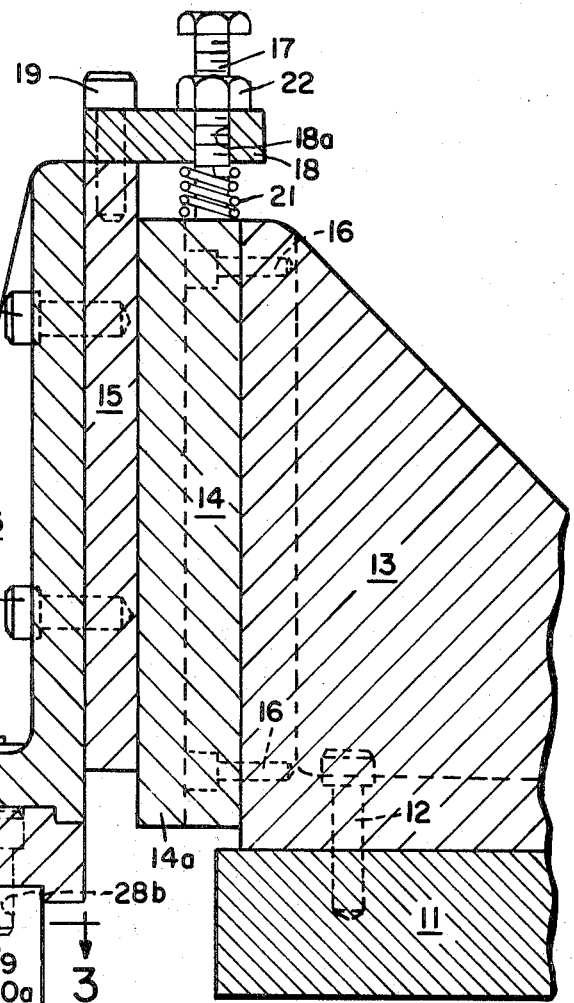
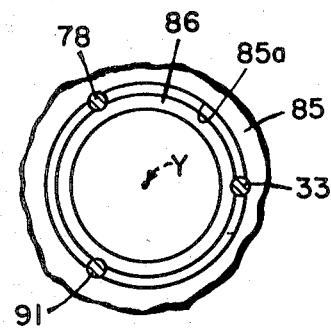
Fig. 3
Fig. 4

DETECTING APPARATUS

BACKGROUND OF THE INVENTION

In many automatic operations it is desirable or necessary to detect or sense whether a part or parts used in such an operation is or are disposed in a desired or required attitude or position for the automatic operation or, indeed, whether such a part or parts has or have been supplied to enable the operation. In parts handling and assembly operations, or any apparatus comprising a required sequence of steps, for example, it may be necessary or extremely desirable that it be assured that a part used in an initial or preliminary step has been provided and is properly positioned in the apparatus before a subsequent step or steps are performed by the apparatus. As a specific example, in an operation or apparatus in which one or more optical lenses are automatically and sequentially supplied to, and positioned and secured in each of a sequence of lens frames or holders, it is of course necessary that each lens holder not only be supplied to the apparatus or operation but also that each lens holder be properly positioned in the apparatus for subsequent receipt and securing therein of the lens supplied to each respective holder. It is, accordingly, an object of the present invention to provide a detecting apparatus which detects or senses whether a part such as a lens holder or frame is present in an open-sided cavity of a container or nest for holding such a part and, when the presence of a part or lens holder is so sensed or detected, whether it is properly positioned in said cavity for subsequent steps to be performed, such as the receipt in a lens holder of one or more optical lenses as previously mentioned. The invention will best be understood from the accompanying drawings taken in conjunction with the detailed description which follows.

BRIEF DESCRIPTION OF THE DRAWINGS

In the drawings:

FIG. 2 is a partially cross-sectional and partially elevational view of the apparatus of the invention, such view being taken generally along line 2—2 of FIG. 1;

FIG. 3 is a top view of part of the apparatus of the invention and taken generally along line 3—3 of FIG. 2, such view being partially in cross-section;

FIG. 4 is a view similar to FIG. 3 and taken generally along line 4—4 of FIG. 2;

Similar reference characters refer to similar parts in each of the figures of the drawings.

PREFERRED EMBODIMENT OF THE INVENTION

Figure 1:
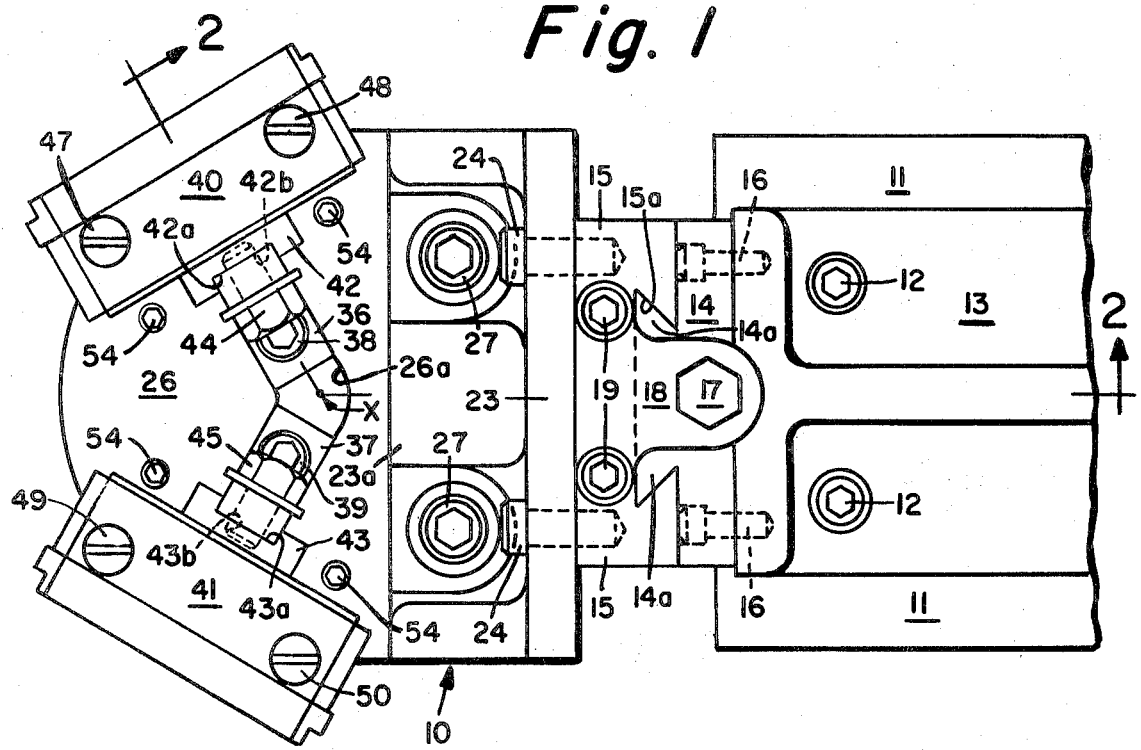
FIG. 1 is a top plan view of an apparatus embodying the invention.

Referring to the drawings in detail, there is shown in FIGS. 1 and 2 one end of a support platform or table 11 which has secured to the upper surface thereof as by bolts such as 12 a first or main support bracket 13 which, for purposes of simplification of the drawings, is shown only partially therein. Viewing FIGS. 1 and 2, there is fastened to the left hand face of bracket 13, as by socket head bolts such as 16, a guide plate 14 including on its left hand face a dove-tail tenon portion 14a cooperative with a dove-tail mortise 15a (FIG. 1) embodied in the right hand surface of a slide member or plate 15. Tenon 14a fits relatively snugly with mortise 15a but with a vertical slidable relationship existing therebetween, in the manner well known in the art.

Downward movement of slide plate or member 15 is limited by a threaded bolt 17 which is screwed through a cooperatively threaded hole 18a provided in a laterally extending bolt-support member 18 which is attached as by bolts such as 19 to the upper edge of slide plate 15. The lower end of bolt 17 rests against the upper edge of guide plate 14, and a compressible or compressed coil spring 21 surrounds the lower end of bolt 17 with the lower end of the spring resting against said upper edge of guide plate 14. The upper end of the spring bears against the lower surface of bolt-support member 18. Bolt 17 also extends through a lock nut 22 which is used to lock bolt 17 in any selected position to which it is screwed through the threads of hole 18a in bolt-support member 18. It will be readily apparent to those skilled in the art that, by such arrangement, the weight of slide plate or member 15, and the apparatus attached thereto and to be hereinafter described, is partially supported by spring 21.

A second support bracket 23 is secured to the left hand face of slide plate or member 15 (viewing FIGS. 1 and 2) as by bolts such as 24, and a horizontally or laterally extending detector assembly including a support plate or frame member 26 is attached adjacent the right hand edge thereof (viewing FIGS. 1 and 2) to the bottom surface of the laterally or horizontally extending bottom or foot portion 23a of bracket 23. As best illustrated in FIG. 2, the upper surface of assembly support plate or frame member 26 is keyed to the bottom surface of said foot portion 23a and the assembly support plate is attached to such foot portion by bolts such as 27.

The upper end of an upright support block 28 (FIGS. 2 and 3) is keyed to the lower surface of support plate 26 and is secured thereto by threaded bolts such as 29 extending downwardly through support plate 26 and screwed into cooperatively threaded holes such as 28a and 28b provided in block 28. A spacer block 30 fits into a channel 28c provided in support block 28 and a probe support 31 fits into a channel 30a provided in spacer block 30. Probe support 31 embodies a vertical channel 31a and a relatively long threaded bolt 32 extends through probe support 31, spacer block 30 and into a cooperatively threaded hole provided in support block 28 to hold such parts together in the relationship illustrated in FIG. 3. A probe or pin 33 (FIG. 2) having a smooth bottom surface is secured in or to the lower end of probe support 31. By such arrangement probe 33 is manually adjustable up or down by loosening bolt 32, and sliding probe support 31 in the respective direction and then retightening bolt 32. It is, however, pointed out that probe 33 is considered to be a fixed probe as will be hereinafter further discussed.

Referring again to FIGS. 1 and 2, there is shown a pair of ell-shaped support members 36 and 37 whose base portions snugly fit into cooperative portions of a channel 26a provided in the upper surface of detector assembly support plate 26 as best illustrated in FIG. 1.

A pair of threaded bolts 38 and 39 extend downwardly through said base portions of support members 36 and 37, respectively, and are screwed into cooperatively threaded holes such as 26b (FIG. 2) provided in said support plate 26.

A pair of sensors 40 and 41 are provided and are secured to the upright portions of ell-shaped support members 36 and 37, respectively, by such portions extending snugly through vertical channels 42a and 43a provided in support blocks 42 and 43 of sensors 40 and 41, respectively, and secured therein by threaded bolts 44 and 45 extending through said upright portions and screwed into cooperatively threaded holes 42b and 43b provided in said support blocks 42 and 43, respectively. Sensors 40 and 41 each including a depending actuating pin or member such as 46 (FIG. 2) which extends downwardly through suitably located holes such as 26c in support plate 26 when the sensors 40 and 41 are mounted on the ell-shaped brackets as described above. The lower ends of the actuating pins or members such as 46 extend somewhat below the lower surface of support plate 26 as shown in FIG. 2 and for a purpose which will become hereinafter apparent. Sensors 40 and 41 do not, per se, form part of the present invention but are purchased items such as workpiece thickness or work size gauges which give dial indications and actuate electrical circuit controlling contacts reflecting whether a work piece is within or without tolerances selected by manual setting of adjustors or adjustment screws 47 and 48, and 49 and 50 provided on the top of gauges 40 and 41, respectively. Sensors 40 and 41 may, for example, each be a Model 134B electric dial indicator which is obtainable from Federal Products Corporation, whose address is Eddy Street, Providence, R.I. 02904, such indicator being sold by such company under the name of Electricator.

Figure 6:
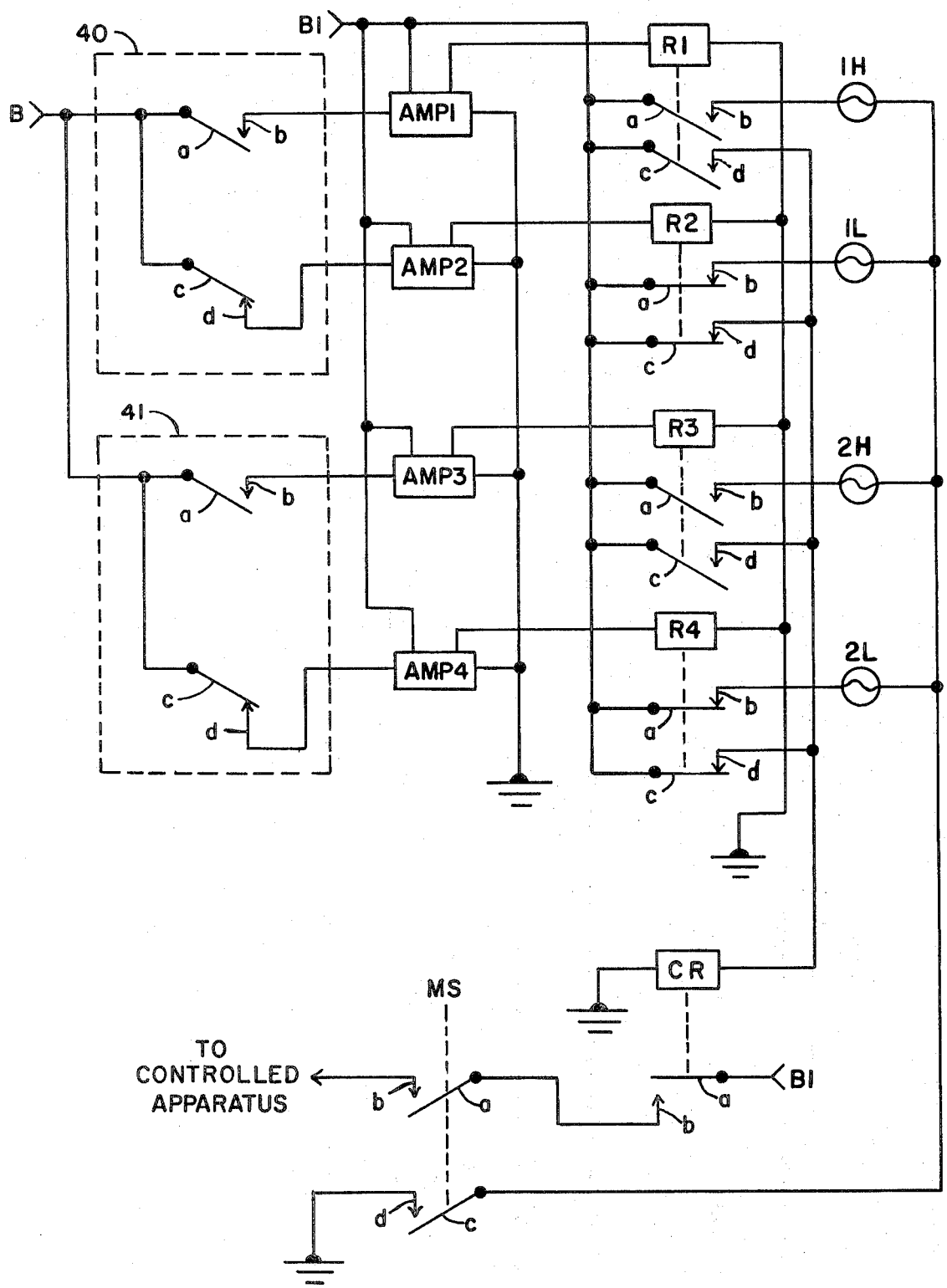
FIG. 6 is a schematic circuit or wiring diagram illustrating a simplified form of electrical display and/or control circuits which may be actuated or employed in practicing the invention.

It is considered sufficient for the purpose of the present description to point out that sensors 40 and 41, that is, the dial indicators such as 40 and 41 each include, as previously mentioned, a sensing pin or member such as 46 (FIG. 2) which actuates sets of electrical circuit controlling contacts contained within each respective sensor or indicator. Such sets of contacts are schematically illustrated in FIG. 6 and the sets of contacts of each sensor include a normally open set of contacts $a-b$ and a normally closed set of contacts $c-d$. Sensing pin such as 46 of sensor 40 is spring biased to a selected lowermost position and when, for example, the sensing pin or member 46 of sensor 40 is actuated in an upward direction a distance selected or set by the manual adjustment of adjustor or adjustment screw 48 of sensor 40, the normally closed set of contacts $c-d$ of such sensor are actuated to open. When sensing pin or member 46 of sensor 40 is actuated further upwardly a distance selected or set by the manual adjustment of adjustor or adjustment screw 47 of sensor 40, the normally open set of contacts $a-b$ of such sensor are actuated to close. Thus, when said sensing pin or member 46 is actuated upwardly to within a selected tolerable range of such upward movement, both sets of contacts of sensor 40 are in their open or electrical circuit interrupting conditions. The sets of contacts of sensor 41 are actuated similarly to that described for the sets of contacts of sensor 40 and, therefore, no detailed description of such actuation is necessary. Sensors 40 and 41 and their associated sets of contacts will be further described hereinafter in operational examples of the invention given in conjunction with FIG. 6 of the drawings.

Figure 5:
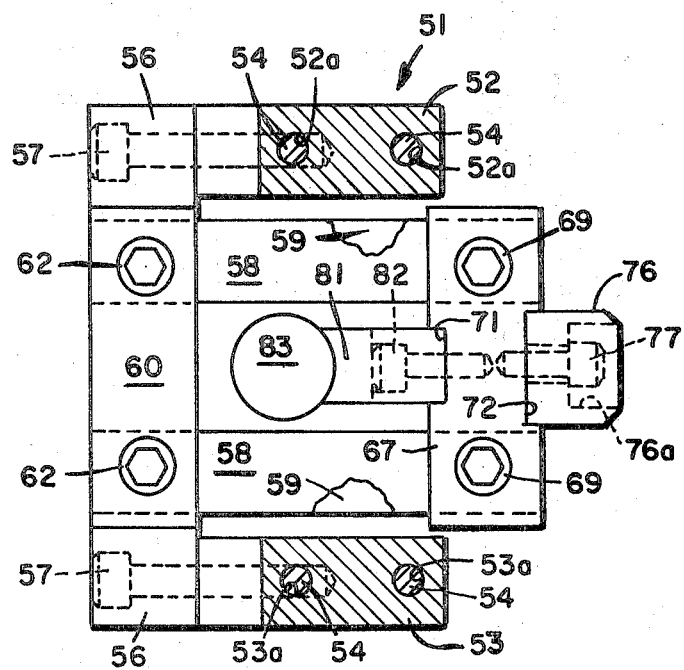
FIG. 5 is a view similar to FIGS. 3 and 4, such view being on an enlarged scale and taken generally along line 5—5 of FIG. 2.

There is associated with each of the sensors 40 and 41 a leaf spring assembly such as assembly 51 associated with sensor 40 and shown in FIGS. 2 and 5 of the drawings. Since the leaf spring assembly associated with sensor 41 is identical to that associated with sensor 40, for purposes of simplification of the drawings, only assembly 51 is shown therein. Furthermore, for purposes of brevity of the description, only the leaf spring assembly 51 associated with sensor 40 will be described in any detail since it will be readily apparent that the corresponding assembly associated with sensor 41 is identical to and operates in the same manner as described below for assembly 51.

Leaf spring assembly 51 comprises a pair of depending support blocks 52 and 53 whose top or upper ends are secured against the bottom surface of support plate 26 as by screws such as 54 (FIGS. 1 and 5) extending downwardly through support plate 26 and screwed into cooperatively threaded holes such as 52a and 53a provided in the top or upper ends of support blocks 52 and 53, respectively. A leaf spring support block 56 is attached to the left hand sides of depending support blocks 52 and 53 as by threaded bolts such as 57 extending through block 56 and into cooperatively threaded holes provided in said left hand sides of said blocks 52 and 53. First or left hand ends of four upper and lower leaf spring members such as 58 and 59, respectively, are secured or clamped against the upper and lower surfaces, respectively, of spring support block 56 by upper and lower clamping plates 60 and 61, respectively, clamping said left hand ends of the leaf spring members 58 and 59 between the respective clamping plate and said upper and lower surfaces. Threaded bolts such as 62 extend through said clamping plates and said left hand ends of spring members 58 and 59, and are screwed into cooperatively threaded holes provided in the top and bottom of support block 56.

The second or right hand ends of upper and lower leaf spring members 58 and 59 are clamped against the upper and lower surfaces of a member 66 which is similar to leaf spring support block 56 but is somewhat shorter than such support block. Such second ends of leaf spring members 58 and 59 are clamped to member 66 by upper and lower clamping plates 67 and 68, respectively, and by bolts such as 69, which correspond respectively to plates 60 and 61, and to bolts 62 discussed above. The manner in which said second ends of the leaf spring members such as 58 and 59 are clamped to member 66 is believed readily apparent from the foregoing description of plates 60 and 61, and bolts 62. Clamping plates 67 and 68 are provided with channels such as 71 and 72 (FIG. 5) and member 66 is provided with vertically extending channels such as 73 and 74 (FIG. 2) which are complemental to the channels such as 71 and 72, respectively, in clamping plates 67 and 68.

A probe support 76 fits snugly within said channels 72 and 74 and is attached to member 66 by a screw such as 77 extending through the probe support and screwed into a cooperatively threaded hole provided in member 66. The head of such screw 77 is disposed in a channel 76a provided in probe support 76 and such support is thereby manually adjustable upwardly or downwardly with relationship to member 66 in the same manner as previously discussed probe support 31 is adjustable in relationship to spacer block 30. A probe or pin 78 having a smooth bottom surface is secured in or to the lower end of probe support 76. It is believed apparent that pin or probe 78 and its support 76 are similar to pin or probe 33 and its support 31 with the exception that probe 78 is vertically movable against the spring tension of the leaf spring members of assembly 51 while probe 33 is considered to be a fixed probe. This will be further discussed hereinafter.

Referring further to FIGS. 2 and 5, the upright portion of an inverted ell-shaped member 81 fits snugly within channels 71 of clamping plates 67 and 68, and channel 73 of member 66, such upright portion being fastened in such channels by a threaded bolt such as 82 which extends through such upright portion and is screwed into a cooperatively threaded hole provided in member 66. A sensing pin contact member 83 includes a headed portion, having a smooth top surface which is in contact with the extreme lower end of sensing pin or member 46 of sensor 40 as illustrated in FIG. 2, and a threaded lower end of such contact member screws into a cooperatively threaded hole provided in the top of the horizontally extending portion of inverted ell-shaped member 81. By such arrangement it will be readily apparent that any upward actuation of member 81, by probe 78 being actuated upwardly, will cause an upward actuation of sensing pin or member 46 of sensor 40 against the previously mentioned downward spring biasing feature of sensing pin 46. However, such upward actuation of sensing pin 46 would be for a considerably smaller distance than said upward actuation of probe 78 as is believed readily apparent. When the force or object which actuated probe 78 in the upward direction is removed, the leaf spring members of leaf spring assembly 51 returns such probe to its initial position and the spring biasing feature of sensing pin 46 of sensor 40 similarly returns such pin to its initial position.

Referring again to FIG. 2, there is shown, in cross-section, a container or nest 85 supported on and secured to the top surface of a table or platform 90, such nest embodying an open topped cavity 85a in which an article 86 having a peripheral annular wall of uniform height is disposed or deposited for subsequent operations to be performed therewith. (See also FIG. 4). Such article may, for example, be an optical lens holder or frame which is intended to receive one or more optical lenses which are to be automatically precisely horizontally deposited in the lens holder. To accomplish such object it is believed obvious that it must be assured that a lens holder such as 86 is present in cavity 85a and, if such is the case, it must be assured that the lens holder is properly or horizontally disposed, positioned or seated in such cavity. It is pointed out that probe supports 31 and 76 are vertically positioned in channels 30a and 74 of members 66 and 30, respectively, so that the extreme lower end of probe 78 extends a relatively minute distance below the extreme lower end of fixed probe 31, such as, for example, for a distance of 0.003 inch. This will be further discussed hereinafter in an operational example of the invention.

There is shown in FIG. 6 of the drawings the previously mentioned sets of electrical circuit controlling contacts of sensors 40 and 41, a group of four amplifiers AMP1 through AMP4, a group of electrical indication or display lamps 1H, 1L, 2H and 2L, and a plurality of electrical relays R1 through R4 and CR which control electrical circuit controlling contacts in electrical circuits to be described. The electrical current supplied through electrical contacts of sensors 40 and 41, shown in FIG. 6 and previously discussed, is a very low current such as, for example, on the order of 20 volts at approximately 1 microampere. This low current minimizes arcing, burning, pitting and sticking of the contacts of the sensors and, thereby, permits very precise contact switching accuracy. However, said low current requires the use of the amplifiers mentioned above and, therefore, two suitable sources of current of proper voltage and capacity are provided for the various devices shown in FIG. 6. Such sources per se are omitted from the drawings for purposes of simplification thereof but the positive terminal of the low current source mentioned above is designated B in FIG. 6 and the negative terminal of such source is shown as an electrical ground. Similarly, the positive terminal of the second or current source used for operation of the amplifiers and relays R1 through R4, and CR, and for the energization of said display lamps, is designated B1 in FIG. 6, and the negative terminal of such source is also shown as an electrical ground. When the detector of the present invention is used for control purposes, said second source of electrical energy or current may be used for the energization or operation of the controlled apparatus.

Referring to FIG. 6 in detail, amplifier AMP1 has an energizing circuit which extends from said terminal B over the set of contacts a–b of sensor 40 when in their closed condition, and thence to the input terminal of such amplifier and through the amplifier to ground. Amplifier AMP2 has an energizing circuit which extends from said terminal B over the set of contacts c–d of sensor 40 in their closed condition, and thence to the input terminal of such amplifier and through the amplifier to ground. Amplifiers AMP3 and AMP4 having energizing circuits which extend from said power source terminal B and in multiple over the sets of contacts a–b and c–d of sensor 41 in their closed conditions and thence to the input terminals of amplifiers AMP3 and AMP4, respectively, and through the respective amplifiers to ground. Relays R1 through R4 have energizing circuits which extend from the output terminals of amplifiers AMP1, AMP2, AMP3 and AMP4 to the input terminals of relays R1, R2, R3 and R4, respectively, and thence through the control windings of such relays to ground.

Lamps 1H, 1L, 2H, and 2L are visual display devices having energizing circuits which extend from said terminal B1 and in multiple over sets of contacts a–b of relays R1, R2, R3 and R4 in the closed condition of such contacts and to the filaments of lamps 1H, 1L, 2H and 2L, respectively, and thence through such filaments and over a set of contacts c–d of a master switch MS in their closed condition to ground.

Relay CR has multiple energizing circuits which extend from terminal B1 in multiple over sets of contacts c–d of relays R1 through R4 in the closed condition of such contacts and thence through the control winding of relay CR to ground. Relay CR is illustrated as partially controlling an energizing circuit for controlled apparatus, such circuit extending from power source terminal B1 over a set of contacts a–b of relay CR when in their closed condition and thence over a set of contacts *a–b* of master switch MS when such switch is closed and thence to said controlled apparatus as indicated in FIG. 6. It is pointed out that the components shown in FIG. 3 are illustrated as in their positions or conditions which exist when the power sources to output terminals B and B1 are turned on and sensors 40 and 41 are in their normal, initial or non-operated conditions. At such time, the sets of contacts *c–d* of sensors 40 and 41 are closed, amplifiers AMP2 and AMP4 are energized, relays R2 and R4 are energized and their sets of contacts *a–b* and *c–d* are closed. At such time the circuits for energizing lamps 1L and 2L are prepared over said sets of contacts *a–b* of relays R2 but such lamps are not illuminated because such circuits are open at the set of contact *c–d* of master switch MS. Relay CR is energized at such time over the sets of contacts *c–d* of relays R2 and R4 and, therefore, the set of contacts *a–b* of relay CR are open and the previously mentioned controlled apparatus is thereby deenergized at such time regardless of whether contacts *a–b* of master switch MS are open or closed, as is readily apparent.

OPERATING EXAMPLE OF THE INVENTION

For the purpose of an operational example of the invention, it will be assumed that table or support platform 11 (FIGS. 1 and 2) on which the detecting apparatus of the invention is supported, is positioned above previously mentioned table 90 which, for said operation example, is assumed to be a round rotatable table which carries, on the upper surface thereof, a plurality of nests or containers, such as 85, which are equally spaced apart about a circumference of the table adjacent the outer periphery thereof. Table 90 is assumed to be intermittently or periodically rotated so that each said nest or container of said plurality thereof is sequentially moved to the position of container 85 shown in FIG. 2, and so that the center point of support 26 and designated by the letter "X" in FIG. 1 is in precise vertical alignment with the center point of the cavity in nest 85 and designated by the letter "Y" in FIG. 4. Such precise vertical alignment is indicated by the broken line designated by the letter "Z" in FIG. 2. By such alignment, the centers of fixed probe 33, movable probe 78 and another movable probe 91 shown in FIG. 4, and which is associated with sensor 41 and corresponds to probe 78 associated with sensor 40, are vertically aligned, as illustrated in FIG. 4, with equally spaced points on the top surface or rim of the previously mentioned upright wall of each lens holder or frame such as 86 disposed in cavity 85*a* of each respective nest or container moved by table 90 to the position shown in FIG. 2. It is pointed out that probes 33 and 78 are shown in FIG. 2 spaced from each other across a diameter of lens holder or frame 86 but this is because FIG. 2 is a view taken along line 2—2 of FIG. 1. In actuality such probes are spaced from each other as illustrated in FIG. 4.

While each nest or container, such as 85, is positioned as illustrated in FIG. 2 and as discussed above, table or platform 11 is moved downwardly, or table or turret 90 is moved upwardly, or such components 11 and 90 are moved toward each other, a distance such that the extreme lower end of fixed probe 33 firmly contacts the upper surface or the rim of the lens holder or frame 86 in cavity 85*a* of nest 85 if there actually is a holder or frame in such cavity. If there is no lens holder in the cavity, probe 33 and lens holder or frame 86 are moved a greater distance toward each other but not to a sufficient distance that the extreme lower end of probe 78 (or probe 91) contacts the upper surface of nest or container 85. It is pointed out that probe 91, similarly to probe 78, is positioned so that its extreme lower end normally extends very slightly below the corresponding end of fixed probe 33.

It should be pointed out that the above-mentioned master switch FIGS. is assumed to be actuated to close its sets of contacts *a–b* and *c–d* in a time relationship with the periodic positioning of each nest or container such as 85 at the position shown in FIG. 2, each such actuation of the master switch occurring only after the detecting apparatus of the invention is actuated to detect or sense the presence of a lens holder in the nest or container so positioned and the proper horizontal positioning of the lens holder in the respective nest if the presence of the holder is detected. The following examples of the operation of the detecting apparatus are given in conjunction with 2, 4 and 6 to clarify the operation of such apparatus.

1. If no lens holder or frame such as 86 is in a nest or container such as 85 when the detecting apparatus is actuated, the lower ends of probes 78 and 91 are not contacted and the sets of contacts *c–d* of sensors 40 and 41 therefore remain closed as shown in FIG. 6. Under such conditions relays R2 and R4 are maintained energized and, when master switch MS subsequently closes its set of contacts *c–d*, lamps 1L and 2L are illuminated to indicate or give a display that there is no lens holder present in the nest or container 85. Relay CR also remains energized so that the controlled apparatus is not actuated at such time.

2. A lens holder or frame such as 86 is present in the nest or container such as 85 and is properly positioned therein when the detecting apparatus is actuated. At such time the lower ends of probes 78 and 91 contact the upper surface or rim of the holder 86 and are actuated upwardly until fixed probe 33 similarly contacts said rim. This opens the sets of contacts *c–d* of sensors 40 and 41 and relays R2 and R4 are thereby released to open their sets of contacts *a–b* and *c–d*. Relay CR is thereby released to close its set of contacts *a–b*. When master switch MS subsequently closes its sets of contacts *a–b* and *c–d* the controlled apparatus is energized but none of the lamps 1H, 1L, 2H or 2L are energized because the energizing circuits therefor are all open at the sets of contacts *a–b* of relays R1 through R4. No display or indication is given, therefore, since no fault exists at such time.

3. A lens holder is present in the nest such as 85 but is tilted therein so that the rim of the lens holder is higher at or adjacent to one or both of the points at which such rim is contacted by the lower ends of one or both of the probes 78 and 91. When the detecting apparatus is then subsequently actuated, one or both of the probes 78 and 91 will be actuated upwardly to open contacts *c–d* of one or both sensors 40 and 41 and close contacts *a–b* of one or both of such sensors. At such time one or both of the relays R2 and R4 are deenergized while a corresponding one or both of the relays R1 and R3 are energized. The closing of contacts *a–b* of one or both of the relays R1 and R3 will prepare the energizing circuits for one or both of the lamps 1H and 2H (lens holder too high at points 1 or 2 or both) and, when master switch MS subsequently closes its contacts *c–d*, one or both of said lamps are illuminated to give a display of a fault detected or sensed and the type and general location of such fault. Although relay CR released when contacts *c–d* of the sensor or sensors opened (relays R2 and R4 released) it was again energized when contacts *a–b* of one or both sensors closed and energized one or both of the relay R1 and R3. Thus when master switch MS closed its contacts *a–b* the controlled apparatus was not energized because of the fault-detected or sensed by the detecting apparatus.

4. A lens holder is present in the nest such as 85 but is tilted therein so that the rim of the lens holder is lower at or adjacent one or both of the points at which such rim is contacted by the lower ends of one or both of the probes 78 and 91. When the detecting apparatus is then subsequently actuated, one or both of the probes 78 and 91 will not be actuated upwardly to open the sets of contacts *c–d* of one or both sensors 40 and 41. At such time one or both of the relays R2 and R4 remain energized, relay CR will be maintained energized and the circuits for one or both of the lamps 1L and 2L will remain prepared to energize one or both of such lamps when master switch MS subsequently closes its contacts *c–d*. When master switch MS does close its contacts *a–b* and *c–d* the controlled apparatus is not energized because contacts *a–b* of relay CR are open reflecting a fault existing. However, lamps 1L or 2L or both are illuminated at such time to give an indication or display of a fault detected or sensed and, if only one of such lamps is illuminated, the type and location of such fault. (Lens holder is too low at point 1 or 2 or both). If both lamps 1L and 2L are illuminated at such time, the indication or display is the same as when there was no lens holder in the nest and the nest must be optically viewed to determine the exact fault then existing.

It is pointed out that although the operational or operating examples of the detecting apparatus of the invention are specifically described in conjunction with the detection or sensing of the presence of a holder or frame for optical lens and the desired or proper horizontal positioning thereof, the apparatus is readily adaptable to use with many other types of articles as will become apparent from the foregoing description taken in conjunction with the accompanying drawings. Furthermore, the apparatus of the invention is not intended to be confined only to use with an apparatus including a rotating table or turret such as 90 and a support table or platform such as 11 but the detecting apparatus can be mounted in many other conceivable manners for detection or sensing of presence of articles and the proper or desired positioning or orientation of such articles. Therefore, although there is herein shown and described only one form of apparatus embodying the invention, it will be understood that various changes and modifications may be made therein within the purview of the appended claims without departing from the spirit and scope of the invention.

We claim:

1. Apparatus for detecting, in an open-sided cavity of a container having a support surface for supporting an article having a peripheral wall of a uniform height, the presence or non-presence of such an article in said cavity and, when the presence of an article is detected, whether such article is correctly or uniformly seated in said cavity, such apparatus comprising, in combination;

I. a detector assembly including a frame member overlying said container and defining a plane parallel to the supporting surface of said container, a reference probe adjustably mounted on said frame member to extend towards said cavity a selected distance from said plane, and a plurality of actuable probes mounted on said frame member and being spring biased away from said frame member, such actuable probes normally extending towards said cavity a distance from said plane slightly greater than that of the reference probe, the probes being spaced from each other such that the lowermost ends thereof are aligned with equally spaced-apart points on the rim of said peripheral wall of one of said articles when supported in said cavity;

II. support means connected with said container and mounting said detector assembly directly over such container and providing controlled movement of said assembly and said container towards and away from each other along a linear path perpendicular to said plane, whereby said frame member and said cavity can be moved towards one another a predetermined distance; and III. a plurality of electrical switches actuated by movement of said actuable probes with respect to said reference probe as said assembly and container are moved towards one another and into contact with said article, whereby the on-off condition of each switch is determined by the positions of said actuable probes with respect to said plane.

2. Apparatus in accordance with claim 1 and in which said actuable probes are two in number.

3. Apparatus in accordance with claim 1 and further including electrical circuit means connected to said switches and including visual display devices for indicating the presence or non-presence of an article in said cavity and, when an article is present, for additionally indicating whether or not the distances from said actuable probes to said plane defined by said frame member lie within acceptable tolerance limits.

4. Apparatus in accordance with claim 1 and further comprising circuit means including amplifier and relay elements for providing output signals indicative of the presence or non-presence of an article in said cavity and, when an article is present, for additionally indicating whether or not the distances from said actuable probes to said plane defined by said frame member lie within acceptable tolerance limits.

5. Apparatus in accordance with claim 1 and in which said electrical switches include normally closed electrical circuit controlling contacts which are actuated open by actuation of said actuable probes toward said plane of said frame member.

6. Apparatus in accordance with claim 1 and in which said electrical switches include both normally closed and normally open electrical circuit controlling contacts which are actuated open and closed, respectively, by actuation of said actuable probes toward said plane of said frame member.

* * * * *